United States Patent [19]

Hatakeyama et al.

[11] 4,421,705

[45] Dec. 20, 1983

[54] METHOD AND APPARATUS FOR ATTACHING SEALING PIECE ONTO POUR-OUT HOLE OF PLASTIC CLOSURE CAP OR CONTAINER

[75] Inventors: Yoshiharu Hatakeyama, Tokyo; Susumu Kimura, Yachiyo, both of Japan

[73] Assignee: Yoshida Industry Co., Ltd., Tokyo, Japan

[21] Appl. No.: 422,432

[22] Filed: Sep. 23, 1982

Related U.S. Application Data

[63] Continuation of Ser. No. 251,941, Apr. 7, 1981, abandoned.

[51] Int. Cl.[3] .................. B29C 6/04; B29C 17/10; B29D 23/02
[52] U.S. Cl. .................. 264/153; 264/259; 264/278; 425/126 R; 425/127; 425/289; 425/809
[58] Field of Search .............. 264/153, 163, 259, 275, 264/278; 425/127, 809, DIG. 35, 126 R, 289

[56] References Cited

U.S. PATENT DOCUMENTS

| | | | |
|---|---|---|---|
| 2,479,959 | 8/1949 | O'Neil | 425/809 |
| 2,811,744 | 11/1957 | Baldanza | 264/153 |
| 2,874,413 | 2/1959 | Grussen | 425/809 |
| 2,965,932 | 12/1960 | Knowles | 264/251 |
| 3,427,688 | 2/1969 | Wilson | 264/153 |
| 3,657,405 | 4/1972 | Langecker | 264/278 |
| 4,117,069 | 9/1978 | Von Holdt | 264/153 |

*Primary Examiner*—James B. Lowe
*Attorney, Agent, or Firm*—Wenderoth, Lind & Ponack

[57] ABSTRACT

The present invention is carried out in combination with the injection molding of a closure cap or container, wherein a continuous sealing strip having a thermoplastic resin layer on the inner surface thereof is supplied intermittently. Then a reciprocable molding member having a sharp edge at the tip thereof is advanced through the sealing strip to a position where a molding cavity in the injection mold defining a pour-out hole of a closure cap or container is closed by a sealing piece punched out from the sealing strip, and thereafter a thermoplastic resin is injected into the molding cavity.

7 Claims, 10 Drawing Figures

4,421,705

METHOD AND APPARATUS FOR ATTACHING SEALING PIECE ONTO POUR-OUT HOLE OF PLASTIC CLOSURE CAP OR CONTAINER

This is a continuation of application Ser. No. 251,941, filed Apr. 7, 1981 and now abandoned.

BACKGROUND OF THE INVENTION

This invention relates to a method and apparatus for attaching a sealing piece onto a pour-out hole of a plastic closure cap or a plastic container.

It has been proposed to attach a sealing piece onto a pour-out hole of a closure cap or a container in order to prove that a material in the container has not been used at all after filling thereof until delivered to a user. The attaching of the sealing piece has been made by holding the molded plastic container or closure cap in an upright position, placing the sealing piece upon the pour-out hole of the container or closure cap, and subjecting it to heat sealing orultrasonic sealing.

However, such sealing technique requires a precise positioning of the container or closure cap to a predetermined position, which makes an automatic sealing machine complicated and expensive. Also, it is required to accurately control the sealing conditions such as sealing time period, temperature and pressure to avoid weak sealing and excessive sealing. Especially, when the sealing piece has to be attached lightly onto the pour-out hole of the container or closure cap so as to be peeled off, such sealing conditions become critical with accurate control of the various factors for sealing.

Accordingly, an object of the present invention is to provide a method and apparatus for attaching a sealing piece onto a pour-out hole of a plastic closure cap or a plastic container very easily without using a special device for holding and positioning after molding thereof.

Another object of the present invention is to provide a method and apparatus for removably attaching a sealing piece onto a pour-out hole of a plastic closure cap or a plastic container without high accuracy of sealing conditions such as required in the conventional sealing technique.

SUMMARY OF THE INVENTION

According to the present method for attaching a sealing piece onto a pour-out hole of a plastic closure cap or a plastic container, a continuous sealing strip having a thermoplastic resin layer on an inner surface thereof is supplied intermittently. A reciprocable molding member having a sharp edge at the tip thereof is advanced through the sealing strip by punching out the strip to a position where a molding cavity in the injection mold defining a pour-out hole of the closure cap or container is closed by a sealing piece punched out from the sealing strip. Then, a thermoplastic resin is injected into the molding cavity, whereby the sealing piece is attached to the injected thermoplastic resin forming the closure cap or container to close the pour-out hole thereof.

Preferably, the injected thermoplastic resin has chemical affinity with the material of the sealing piece, so that the thermoplastic resin on the sealing piece is made partially molten and integrally solidifies with the injected material to close the pour-out hole of the molded closure cap or container.

According to the present apparatus for attaching a sealing piece onto a pour-out hole of a plastic closure cap or container, the apparatus comprises an injection molding device having a cavity for molding the closure cap or container. The cavity is open at an end portion defining a pour-out hole of the closure coap or container. Means is provided for supplying a continuous sealing strip intermittently in a direction transverse to an axis of the pour-out hole. A reciprocable molding member having a sharp edge at the tip thereof is provided in the axial direction of the pour-out hole and on one side of the sealing strip opposite to the cavity. The molding member is extensible by punching out the sealing piece from the sealing strip to a position closing the open end of the cavity.

Other objects and features of the present invention will become apparent from the following detailed description of preferred embodiments thereof when taken in conjunction with the accompanying drawings, in which:

DETAILED DESCRIPTION OF THE INVENTION

Figure 1:
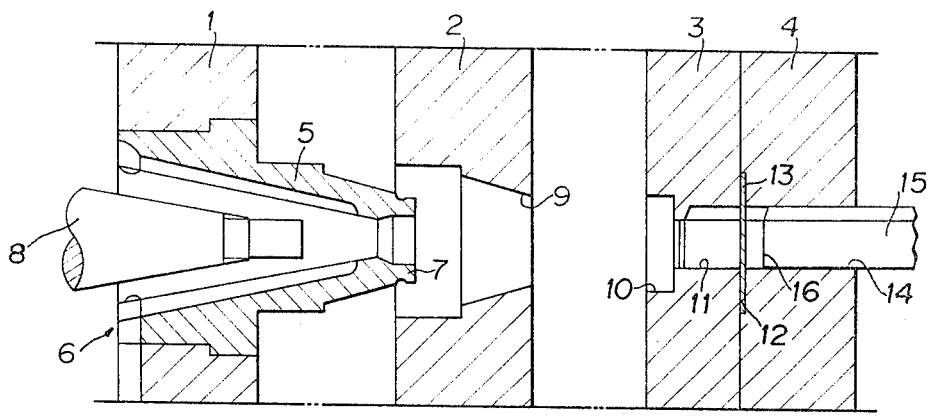
FIG. 1 to FIG. 3 are partially sectioned views showing an apparatus according to the present invention in different operational positions for attaching a sealing piece onto a pour-out hole of a plastic closure cap.
Figure 2:
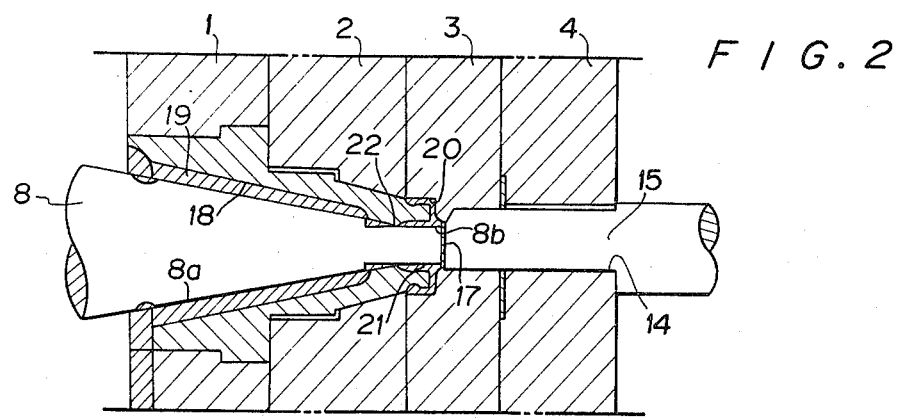
Figure 3:
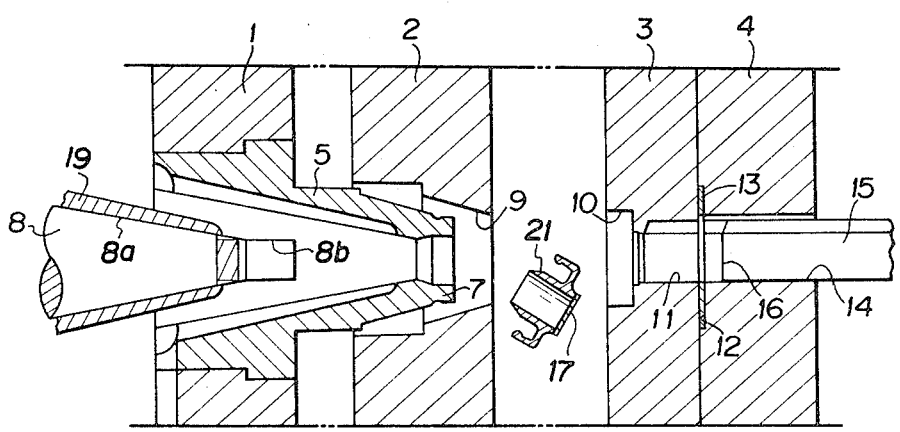
Figure 4:
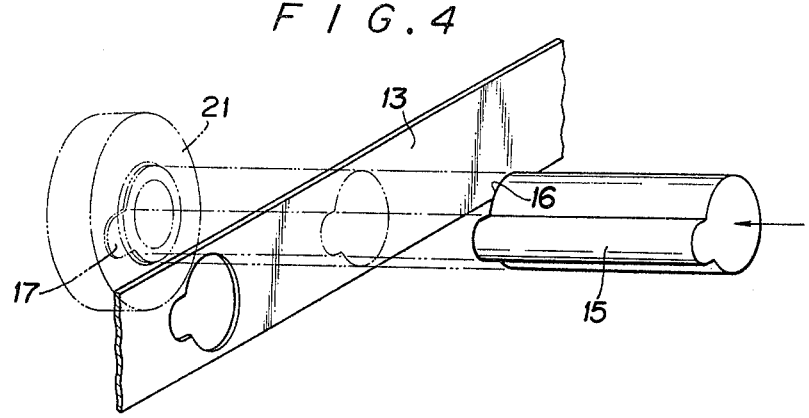
FIG. 4 to FIG. 6 are perspective views showing a process for punching out a sealing piece from a continuous strip and attaching it to the pour-out hole of the plastic closure cap.
Figure 5:
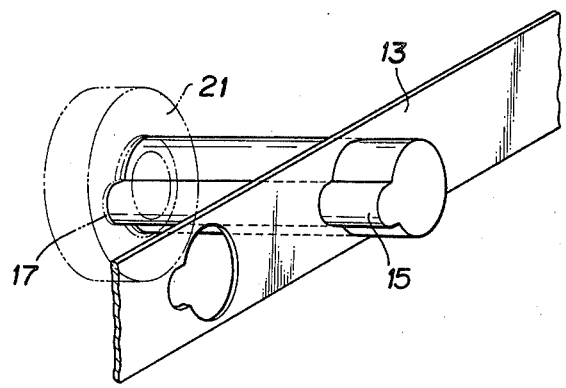
Figure 6:
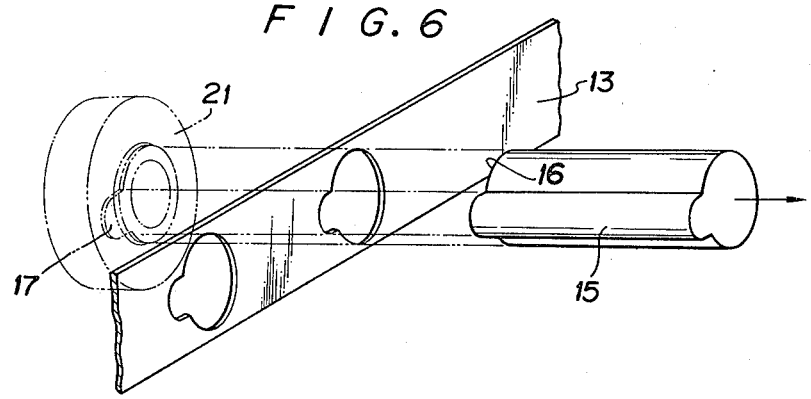
Figure 7:
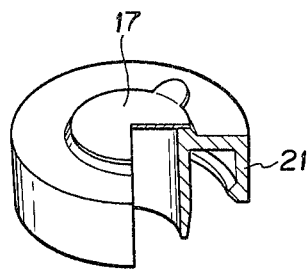
FIG. 7 is a partially sectioned perspective view showing the plastic closure cap sealed by the sealing piece.

Referring to an apparatus of the present invention shown in FIG. 1 through FIG. 3, the apparatus comprises four molding blocks 1 to 4 in which second to fourth molding blocks 2 to 4 are made to be movable toward and away from the first molding block 1. The first molding block 1 supports a male mold section 5 of an injection molding device 6. The male mold section 5 projects beyond the end face of the first molding block 1 toward the second molding block 2 and has an open mouth portion 7 at the projected end thereof. Provided inside the male mold section 5 is a core 8 which is arranged to be movable in the axial direction thereof. The second molding block 2 has a transverse bore 9 therethrough which is large enough to snugly enclose the projecting portion of the male mold section 5 except the open mouth portion 7 thereof. Accordingly, when the second molding block 2 encloses the projecting male mold section 5 by moving toward the first molding block 1 until the blocks 1 and 2 abut with each other, the open mouth portion 7 of the male mold section 5 still projects beyond the end face of the second molding block 2. The third molding block 3 has a recess 10 at an inner end surface thereof, which is large enough to enclose the open mouth portion 7 of the male mold section 5 with a small annular space therebetween when the third molding block 3 is brought into contact with the second molding block 2. The third molding block 3 also has a bore 11 in communication with the recess 10 and extending to the outer end surface thereof in the axial direction of the open mouth portion 7 of the male mold section 5. The fourth molding block 4 is made to be movable together with the third molding block 3 and has a shallow groove 12 at the interface between the third and fourth molding blocks. The shallow groove 12 extends in the horizontal direction transverse to the axial direction of the open mouth portion 7. Provided in the shallow groove 12 is a sealing strip 13 which is supplied intermittently along the groove 12. The fourth molding block 4 also has a horizontal bore 14 in communication with the shallow groove 12 and also registered with or in line with the bore 11 in the third sealing block 3. Snugly provided in the horizontal bore 14 in the fourth molding block 4 is a rod-shaped female molding section 15 which is reciprocable along the bores 11 and 14 in the third and fourth molding blocks 3 and 4, respectively. As shown in FIGS. 4 to 6, these bores 11 and 14 as well as the female mold section 15 each has a sectional shape of substantially circular configuration with an outwardly projecting tongue on one peripheral part thereof. The female molding section 15 has a sharp cutting peripheral edge 16 at the inner end thereof, so that when the rod-shaped female molding section 15 is advanced inwardly beyond the interface between the third and fourth molding blocks, a sealing piece 17 is punched out of the sealing strip 13 and carried inwardly by the end of the female molding section 15.

It is arranged such that after the second, third and fourth molding blocks are fully moved toward the first molding block to close the mold by contact with each other, the core 8 as well as the female molding section 15 extend inwardly until the inner ends of the core 8 and the rod-shaped female molding section 15 are collided with each other with the sealing piece 17 being sandwiched therebetween. This colliding position is very close to the open mouth portion 7 of the male mold section 5. According to the embodiment of the present invention shown in FIGS. 1 to 3, in the closed position of the mold where the core 8 and the female molding section 15 are fully extended inwardly as set forth above, a frusto-conical shaped cavity 18 for molding a tube container 19 is formed between the male mold section 5 and the conical wall part 8a of the core 8 and also a double annular shaped cavity 20 for molding a closure cap 21 for the tube container 1 is formed between the cylindrical tip part 8b of the core 8, the open mouth portion 7 of the male mold section 5, the inner wall of the recess 10 in the third molding block 3, and the sealing piece 17 at the extended inner end of the female molding section 15. The two cavities 18 and 20 are connected with each other by way of a very narrow annular channel 22. Under such closed position of the mold, a molten thermoplastic resin is injected into these cavities 18 and 20 through an injection port therebetween and then cooled in the conventional manner. By such injection of the thermoplastic resin, the sealing piece 17 partially defining the cavity 20 is tightly attached onto the pour-out hole of the molded closure cap 21. After cooling the injected resin, the mold is open by moving the second, third and fourth molding blocks away from the first molding block and also by retracting outwardly the core 8 as well as the female molding section 15. At this time, the molded closure cap 21 having the sealing piece 17 attached thereon is torn off from the molded tube container 19 at the annular channel portion therebetween and drops below the mold as shown in FIG. 3. On the other hand, the molded tube container 19 is taken out of the mold together with the core 8. When at its retracted position the rod-shaped female molding section 15 has moved back through the punched sealing strip 13 as shown in FIG. 6 and allows the sealing strip 13 to advance as much as one predetermined stroke to provide a blank section in line with the female mold section 15 for the next molding process, as shown in FIG. 4.

Figure 8:
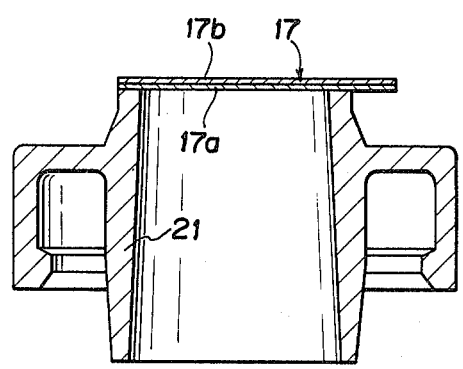
FIG. 8 and FIG. 9 are sectional views showing the plastic closure cap sealed by another type of sealing piece.
Figure 9:
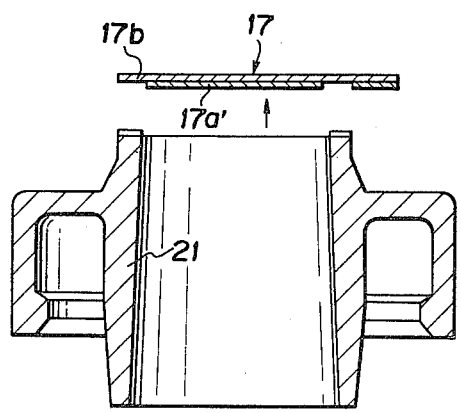

The sealing strip 13 to be used in the present invention has to have a plastic layer that is made at least partially molten by the heat of the injected thermoplastic resin in the cavity 20 and is adhered to the molded material in the cavity after cooling thereof. Preferably, the plastic layer of the sealing strip 13 should have chemical affinity with the thermoplastic resin injected for molding the tube container or closure cap. The term chemical affinity used herein means that both resins have polymeric units derived from the same monomer. For example, when the injected thermoplastic resin for molding the tube container or closure cap is polyethylene resin, the sealing strip is also made of polyethylene resin or ionomer resin. It is not necessary to make the sealing strip entirely from the above polyethylene resin or ionomer resin, but so far as the inner side of the sealing strip, which is attached to the molded plastic, is concerned, it should be made of such resin. Accordingly, a sealing strip having plural layers of polyethylene resin or ionomer resin can be used, such as polyethylene resin laminated with aluminum foil, polyethylene resin laminated with polyethylene terephthalate resin with or without an adhesive agent, ionomer resin laminated with polyethylene terephthalate resin with an adhesive agent, or ionomer resin laminated with nylon with adhesive agent. FIG. 8 and FIG. 9 show an embodiment in which the inner closure cap 21 is made of polyethylene resin and the sealing piece 17 is made of a layer of polyethylene resin 17a and a layer of polyethylene terephthalate resin 17b. As can be understood, the polyethylene resin 17a of the sealing piece 17 is integrally attached with the closure cap 21 made of polyethylene resin. Accordingly, when the sealing piece 17 is pulled out of the closure cap 21, the integrally attached polyethylene resin 17a of the sealing piece 17 remains on the peripheral edge of the closure cap 21 and is separated easily from the polyethylene terephthalate resin layer 17b and other non-integrated polyethylene resin portions 17a' of the sealing piece.

In the examples of the sealing strip set forth above, it is preferable to use a strip having ionomer resin when a detachable seal such as an easily removable virgin seal of a container or closure cap of the container is desired. The molecular structure of ionomer resin comprises ethylene and a carboxylic acid group ionically bonded by a metal such as sodium or zinc. When the sealing piece of ionomer resin is subjected to heating at a temperature higher than 110° C., only ethylene in the molecular structure becomes molten and is integrally attached to a molded article of polyethylene resin, but the carboxylic acid group cannot exhibit adhesion at all. Thus, by keeping the termperature above 110° C., the sealing piece of ionomer resin can be firmly attached to the molded article of polyethylene resin, but the attachment is not as strong as that of a sealing piece made of polyethylene resin. According, when it is desired to remove the attached sealing piece, it can be torn off easily. For this reason, the sealing piece of ionomer resin is very desirable for use as a virgin seal material.

The present invention is very advantageous when used to apply a virgin seal upon a pour-out hole of a plastic container or closure cap, because the material for the virgin seal can be selected from various materials such as polyethylene film laminated with metal foil. Also, the attachment of the sealing piece can be weakened as desired by reducing the amount of melting of the plastic layer on the sealing piece by adding organic or inorganic material having higher melting point.

The sealing piece 17 punched out of the sealing strip 13 preferably a tongue thereon for easy removal of the virgin seal by grasping with fingers.

Figure 10:
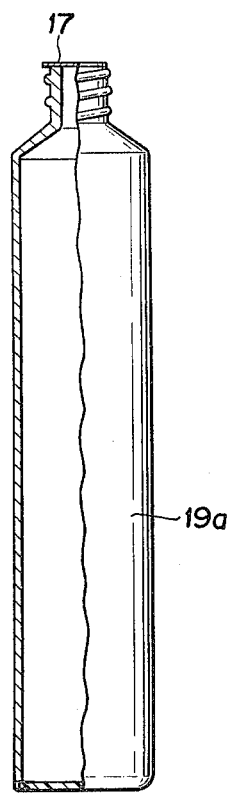
FIG. 10 is a partially sectioned front view showing a plastic tube sealed by a sealing piece in accordance with a second embodiment of the present invention.

In the embodiment of the present invention shown in FIGS. 1 to 9, the sealing piece 17 is attached to the closure cap 21. However, it goes without saying that by changing the design of the cavity in the injection mold, the present invention can be applied to attach the sealing piece to the pour-out hole of a tube container 19a as shown in FIG. 10. Any other modifications and alterations may be made within the spirit of the present invention.

What is claimed is:

1. A method for attaching a removable sealing piece onto an end of a plastic closure cap or container to seal a pour-out hole through such end, while forming said closure cap or container by injection molding, said method comprising:
    providing members defining an injection molding cavity for molding the closure cap or container, said cavity being open an an end portion to define a pour-out hole of said closure cap or container;
    providing a continuous sealing strip having a thermoplastic layer;
    intermittently advancing said strip in a direction transverse to the axis of said pour-out hole to position a portion of said strip at a location spaced from and confronting said open end portion of said cavity;
    providing a molding member adjacent a side of said strip opposite said cavity, said molding member having a tip with a shaft edge;
    advancing said molding member toward said strip in the direction of said axis, punching a sealing piece from said portion of said strip by said sharp edge of said tip, and conveying said sealing piece in said direction of said axis toward said cavity by means of said molding member only, while maintaining said cavity defining members immobile until said sealing piece reaches a position closing said open end portion of said cavity; and
    injecting a thermoplastic resin having chemical affinity with said thermoplastic layer into said cavity, thereby forming said closure cap or container and simultaneously joining said thermoplastic layer of said sealing piece to an end of said closure cap or container.

2. A method as claimed in claim 1, wherein said closure cap or container is made of polyethylene, and said sealing strip comprises said layer formed of polyethylene and an outer layer of polyethylene terephthalate.

3. A method as claimed in claim 1, wherein said closure cap or container is made of polyethylene, and said layer of said sealing strip comprises an inonomer resin.

4. An apparatus for fomring a plastic closure cap or container by injection molding, while attaching a removable sealing piece onto an end of the closure cap or container to seal a pour-out hole through such end, said apparatus comprising:
    an injection molding device including members defining a cavity for molding the closure cap or container, said cavity being open at an end portion to define a pour-out hole of the closure cap or container;
    means for intermittently advancing a sealing strip having a thermoplastic layer in a direction transverse to the axis of the pour-out hole to position a portion of said strip at a location spaced from and confronting said open end portion of said cavity;
    a molding member positioned adjacent a side of said strip opposite said cavity, said molding member having a tip with a sharp edge;
    means mounting said molding member for advancement in the direction of said axis toward said strip, for causing said sharp edge of said tip to punch a sealing piece from said portion of said strip, and for conveying said sealing piece in said direction of said axis toward said cavity by means of said molding member only, with said cavity defining members of said injection molding device being maintained immobile, until said sealing piece reaches a position closing said end portion of said cavity; and
    means for injecting a thermoplastic resin having a chemical affinity with said thermoplastic layer into said cavity, thereby for forming the closure cap or container and simultaneously for joining said thermoplastic layer of said sealing piece to an end of said closure cap or container.

5. An apparatus as claimed in claim 4, wherein said sealing strip is provided between two molding blocks across which two registered bores are provided for snugly receiving and guiding said molding member during advancement thereof.

6. An apparatus as claimed in claim 5, wherein said two molding blocks are movable toward said injection molding device.

7. An apparatus as claimed in claims 5 or 6, wherein said bores of said two molding blocks have a cross sectional shape of substantially circular configuration with an outwardly projecting tongue thereon.

* * * * *